United States Patent
Shuart et al.

(10) Patent No.: US 9,672,335 B2
(45) Date of Patent: Jun. 6, 2017

(54) COGNITIVE-BASED LOGON PROCESS FOR COMPUTING DEVICE

(76) Inventors: Laird H Shuart, Topeka, KS (US); Dustin Matthew Engelhaupt, Berryton, KS (US); Sharon Elizabeth Jankowski, Leawood, KS (US); Bruce David Jankowski, Leawood, KS (US); Marcia L. Shuart, Topeka, KS (US)

( * ) Notice: Subject to any disclaimer, the term of this patent is extended or adjusted under 35 U.S.C. 154(b) by 500 days.

(21) Appl. No.: 12/928,593

(22) Filed: Dec. 15, 2010

(65) Prior Publication Data

US 2011/0162067 A1    Jun. 30, 2011

Related U.S. Application Data

(60) Provisional application No. 61/284,344, filed on Dec. 17, 2009.

(51) Int. Cl.
*G06F 21/00* (2013.01)
*G06F 21/31* (2013.01)

(52) U.S. Cl.
CPC .................................... *G06F 21/31* (2013.01)

(58) Field of Classification Search
CPC ......... H04L 9/3228; G06F 21/30; G06F 21/31
USPC ....................................................... 726/2–21
See application file for complete search history.

(56) References Cited

U.S. PATENT DOCUMENTS

| | | | |
|---|---|---|---|
| 5,224,566 A * | 7/1993 | Stepanian et al. | 180/272 |
| 6,485,417 B1 * | 11/2002 | Bowles et al. | 600/300 |
| 7,131,009 B2 | 10/2006 | Scheidt | |
| 7,305,559 B2 | 12/2007 | Schreiber | |
| 7,636,855 B2 | 12/2009 | Applebaum | |
| 2003/0212894 A1 * | 11/2003 | Buck et al. | 713/184 |
| 2004/0036601 A1 * | 2/2004 | Obradovich | 340/540 |
| 2006/0053298 A1 * | 3/2006 | Ingerman et al. | 713/182 |
| 2006/0179488 A1 | 8/2006 | Kokumai | |
| 2007/0283416 A1 * | 12/2007 | Renaud | 726/2 |
| 2008/0005788 A1 | 1/2008 | Ramaswamy | |
| 2008/0092209 A1 | 4/2008 | Davis | |
| 2008/0098464 A1 * | 4/2008 | Mizrah | 726/5 |
| 2008/0104415 A1 | 5/2008 | Wasserman | |
| 2008/0187894 A1 | 8/2008 | Cady | |
| 2008/0229408 A1 * | 9/2008 | Dinges et al. | 726/19 |
| 2008/0263636 A1 * | 10/2008 | Gusler et al. | 726/4 |
| 2009/0276839 A1 * | 11/2009 | Peneder | 726/8 |
| 2009/0282239 A1 * | 11/2009 | Doleh | 713/155 |
| 2010/0076274 A1 * | 3/2010 | Severson | 600/300 |
| 2010/0081889 A1 | 4/2010 | Downs, III | |

(Continued)

*Primary Examiner* — Joseph P Hirl
*Assistant Examiner* — Chi Nguy (57) ABSTRACT

A method of user logon to a computing device or computer system that, distinct from requiring entry of a set of known logon credentials such as a username and password, introduces an additional thought-directed user interface whereby the user must respond to one or more prompts that measure the user's cognitive function at the time of logon or during an active logon session. The user's responses to these prompts are evaluated for several purposes, including determining whether the user demonstrates the required level of cognitive function to gain access to the computer system or continue an active logon session. The user's responses and associated data may also be stored and retrieved at a later time for various purposes, including determining whether and to what extent the user's level of cognitive function is improving, diminishing, or remaining static over time.

17 Claims, 5 Drawing Sheets

(56) References Cited

U.S. PATENT DOCUMENTS

2010/0115465 A1 5/2010 Lu
2010/0122341 A1 5/2010 Golle

* cited by examiner

COGNITIVE-BASED LOGON PROCESS FOR COMPUTING DEVICE

CROSS-REFERENCE TO RELATED APPLICATIONS

This application claims the benefit of provisional patent application Ser. No. 61/284,344, filed Dec. 17, 2009.

FEDERALLY SPONSORED RESEARCH

Not Applicable

SEQUENCE LISTING OR PROGRAM

Not Applicable

BACKGROUND

Field

This invention relates to the field of user authentication and authorization, and more particularly to a cognitive-based logon process for accessing a computing device and its systems, applications, directories, or files.

Prior Art

Authentication is the process of verifying a user's identity. In the context of a computer system logon, authentication is typically a two-step process. First, the user will enter a username, user ID, or other unique sequence of characters that identifies the user. In many cases, this information is known not only to the user, but also to others through a directory listing or other source. To complete the process, the user must then enter a pre-selected or pre-assigned password, passphrase, passkey, PIN number, or other unique sequence of characters that is secret and known only to the user and the computer system. If the two pieces of logon information successfully correspond, the user is authenticated, since ostensibly the user is the only individual who could know both pieces of information.

Authorization, meanwhile, is a mechanism by which a computer system determines what level of access an authenticated user should be granted to secure resources within the system. For example, a system might be designed to provide certain users with unrestricted access to all directories and files within the system, while other users are permitted to access only certain directories and files. Similarly, a database management system might provide certain users with the ability to read, write, edit, delete, or upload files, while other users are limited to read-only access.

Because passwords may be stolen or divulged, thereby rendering the computer system susceptible to unauthorized access, some systems use additional or alternate methods of authentication and/or authorization. For example, a system may require the presence of a physical token, such as a card with a magnetic strip that can be swiped by the user and read by the system. Other systems may rely on the use of biometrics, or characteristics (either physiological or behavioral) that can be used to distinguish one individual from another through the use of digital equipment. Examples of biometrics that may be used to authenticate a user's identity include 2D face, 3D face, hand geometry, single fingerprint, palm, full hand, signature, finger vein, iris, retina, ear, DNA, typing rhythm, gait, and voice. The use of biometrics signals an important shift in the authentication field in that rather than simply verifying an object possessed by the user, such as a secret password or a physical token, the system is able to analyze and verify the inherent traits and characteristics of the user himself.

Both authentication and authorization are useful for controlling access to computer systems and areas within those systems where sensitive information is stored. However, in an environment where many computer-based job functions require a high degree of skill, dexterity, alertness, focus, and/or concentration, the mere verification of a user's identity may not be enough. In many cases, it is important for an employer to verify not only that a user is who he says he is, and that he has a certain job title or security clearance level, but also that he is able to perform up to his usual abilities at that particular time. Similarly, many users of personal computers suffer from some degree of impairment to their memory, language, or other mental functions due to age, illness, trauma, and/or degenerative conditions such as Alzheimer's. These persons (and their caretakers) should want to ensure that they are mentally alert and aware enough to perform basic tasks before logging onto a computer where, absent supervision, they might enter into financial transactions, share personal information, or engage in other potentially harmful activities.

These concerns are addressed by an efficient and economical method of authentication and/or authorization that measures the user's cognitive function prior to allowing the user to have full access to a computing device. Cognition, a term which refers to both the mind and the brain, is defined as the "application of the process of thought to knowing" to create new knowledge. A user's cognitive function, or the brain mechanisms involved with thinking, reasoning, learning, and remembering, can be determined through his responses to certain prompts that measure, among other things, his attention, awareness, comprehension, concentration, decision making, executive function, judgment, logical thinking, long-term memory, math skills, perception, planning, problem-solving, short-term memory, symbolic thinking, and visio-spatial recognition. Questions that measure an individual's cognitive function have been used for years in the fields of psychology, psychiatry, education, and human resource management for a variety of purposes, but have yet to be used as a basis for authenticating or authorizing the user of a computer system as described herein.

In the short term, a user's responses to cognitive-based prompts will enable the computer to determine whether the user demonstrates the required level of cognitive function to proceed with the current logon session. If the user responds in a satisfactory manner, he will be granted access to all or part of the system. If not, he will be denied access to all or part of the system. Over the longer term, meanwhile, the user's responses across multiple logon sessions will allow the computer to determine whether the user's level of cognitive function has generally improved, diminished, or remained static. This capability is particularly useful in the case of persons with degenerative mental conditions. Additionally, the user's pattern of responses to certain types of questions will, over time, provide a basis for authenticating the user through cognitive biometrics (also known as "cognimetrics"), or the specific response of that user's brain to certain stimuli.

It is important to note that true cognitive-based prompts should not be confused with cognitive passwords, which have been used for many years and routinely serve as secondary layers of security or secondary forms of access. Cognitive password systems are merely a form of knowledge-based authentication in which a user is required to answer questions about something he already intrinsically knows in order to verify his identity. For example, a cognitive password system might require the user to answer a factual question such as "What was the name of your first dog?" or a preference question such as "What is your favorite color?" In each case, the user has already provided the answer to the computer system and is simply required to recall that answer at the time of logon. While cognitive password systems are useful, they fail to provide the same benefits as systems that introduce true cognitive-based prompts.

SUMMARY

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The invention requires the user to respond to a set of one or more random cognitive logon variables as the basis for a challenge-response logon protocol. As used herein, the term "random cognitive logon variable" means a question and/or mental exercise that (a) is randomly selected by the computer and is unknown to and undeterminable in detail by the user at the time of logon, (b) cannot be memorized prior to the logon attempt, (c) requires cognition in order to accurately respond, and (d) may require the use of motor skills beyond a simple multiple-choice response. Examples of cognitive variables include fill-in-the-blank, short answer, or other questions or exercises measuring the user's verbal reasoning, quantitative reasoning, visual reasoning, and/or short-term memory skills. Random cognitive logon variables may include, more specifically, vocabulary, comprehension, pattern analysis, matrices, number series, equation-building, and may include other questions or exercises similar to those found in other standardized intelligence tests. Random cognitive logon variables may range in format and difficulty, but in any event do not include prompts for the following: (i) questions whose responses can be arrived at by recall or recognition; (ii) passwords that can be memorized or written down by the user (i.e., known shared secrets); (iii) facts associated with the user's life experiences; (iv) preferences previously expressed by the user; (v) recognition of an image, emblem, icon, or series of characters to which the user has previously been exposed; or (vi) re-entry of a series of characters displayed on the screen (e.g., CAPTCHA).

As further described herein, the invention requires the user to respond to a set of one or more specifically designed random cognitive logon variables in order to (a) determine whether the user demonstrates the required level of cognitive function to acquire full or limited access to the computer system or continue the current active logon session with or without restrictions, and/or (b) establish an historical baseline performance for the user, against which the user's performance during recent logon sessions can be measured to determine whether the user's level of cognitive function is improving, diminishing, or remaining static over time. In addition, subsequent random cognitive logon variables may be presented at random, regular, or user-initiated intervals during an active logon session to help ensure that the user remains alert, aware, and focused. Through the user's collected responses to the random cognitive logon variables and associated data output, the computer is eventually able to identify the user's individual cognitive fingerprint for authentication and/or authorization purposes.

BRIEF DESCRIPTION OF THE DRAWINGS

The invention's features, aspects, and useful effects will be more apparent with the description of the advantageous embodiments and the illustrations in conjunction with the attached drawings, of which.

DETAILED DESCRIPTION

Objects, technical solutions, and advantages of the invention will be easily understood by reference to the following description of embodiments when read in conjunction with the accompanying drawings.

The following terms are necessary to further understand these embodiments:

"Accurate" means an exactly correct response or a response deviating only slightly or within acceptable limits from the exactly correct response (or, if there are multiple exactly correct responses, then one such response), or any response given depending on which application is being used. In other words, it means the accurate, correct, or acceptable response to a random cognitive logon variable or outside cognitive variable. Variables are designed to be evaluated in broad general terms (e.g., a math variable) and then evaluated in more detail through another process that breaks down the variable by the cognitive skills needed to answer that variable, allowing for the measurement of a broad range of cognitive skills that include, for example, reasoning, decision making, symbolic thinking, problem solving, judgment, and/or attention. A response can be technically correct, but not the preferred response to the random cognitive logon variable. Virtually any outside response being made as part of a special standardized cognitive test that was designed and/or will be evaluated by a mental health professional is considered accurate, because the purpose of such a cognitive test is usually to evaluate the cognitive skill and/or mental alertness of the user and all responses are meaningful to the evaluation process, whether correct, nearly correct, or incorrect.

For the OPTION A embodiment, accurate means correct, an exact match. For OPTION B, accurate means correct an exact match or deviating only slightly or within acceptable limits from a standard. For OPTION C, accurate also includes the special meaning of any measurable response given because of the purpose and nature of a cognitive test to be evaluated by a mental health professional. For purposes of OPTION D, accurate means correct, an exact match, and the user is told immediately if the response is correct or incorrect, but may continue through the entire set of variables either way.

"Associated information" means information associated with a specific user and/or a specific random cognitive logon variable, including information that may have been imported from another database, data derived from the presentation of that variable to the user, data derived and associated with the resulting cognitive logon response made to that variable, data relating to the credentials created during that logon process, the user's historical data from the baseline database including information that may have been imported from another database that may be located outside the component, the employer's authentication/authorization criteria, and/or data derived from the four level multi-factor process relating to the current logon attempt.

"Cognitive data tag" means the identification attached to a random cognitive logon variable delineating at least one general cognitive skill, and the additional specific cognitive skill(s) required to accurately respond to that variable, the difficulty level of that variable, and whether or not that variable is a key random cognitive logon variable.

"Cognitive logon credential," "random cognitive logon credential," or "credential" means a logon credential for a specific component that must be jointly created by the user and the computer system through a meeting of the minds involving a random cognitive logon variable selected by the computer system for that component, and the accurate response to that variable that must be made by the user. This credential cannot be created unilaterally by the user or the computer.

"Cognitive logon response" means the accurate response to a specific random cognitive logon variable (or, if there are multiple exactly correct responses, then one such response), which is used for credential creation, shared secret purposes, and authentication/authorization purposes.

"Data output" means data collected from the current logon attempt, including the number of cognitive logon credentials created and other data relating to the four level multi-factor processing for the current logon attempt (including whether the computer was instructed to grant or deny that user access to all or part of the computer system), and any other associated information and/or data that might be developed and used during the process and/or which may be sent for storage in a target storage area following completion of the process.

"Four level multi-factor process/four level multi-factor processing/four level multi-factor cognitive response and evaluation process/cognitive response and evaluation process" can all be used interchangeably and mean the process disclosed herein comprised of presenting a random cognitive logon variable to the user, receiving input from the user, determining the accuracy of that input, generating output, and storing output which may be retrieved later and used for authentication/authorization purposes and that allows for the validation, evaluation and monitoring of the user's cognitive skills and mental alertness.

"Key cognitive logon response" means a response to a key random cognitive logon variable that is used to create the user's baseline and to determine the user's cognitive fingerprint, against which authentication will be tested.

"Key random cognitive logon variable" means a random cognitive logon variable that will be presented more than once to the user and which is critical to building the baseline data against which authentication will be tested. The user is never told which random cognitive logon variables are key, and it would be hard to guess because the numbers, shapes, colors, and/or words used in the variable will be changed each time, while the same basic scope and format of the variable stays the same, which would make it hard for the user to ever identify. For example, maybe the color blue is the user's key color but the other colors are not—so even a similar question with a different color would not be a key variable.

"Outside cognitive variable" means a variable, other than a random cognitive logon variable, that may be part of a set of cognitive test questions that comprise a standardized test, cognitive game (including a game designed specifically for the diagnosis and treatment of Alzheimer's disease), or other exercise developed by a mental health professional.

"Outside component" means a component consisting of a set of outside cognitive variables.

"Outside credential" means a component logon credential created by making an accurate response to an outside cognitive variable.

"Outside response" means a response to an outside cognitive variable.

"Random cognitive logon variable" has the meaning set forth in the Summary.

"Thought-directed user interface" means a place where interaction between a human and machine occurs, the goal of which is the effective operation and control of the machine and recurring, useful feedback from the machine regarding such. In this process the interface is comprised of a self-checking and self-completing software component that controls the logon process, the outcome of which is totally dependent upon the user's responses, representing the manifestation of the user's thoughts to a set of computer-selected variables.

"Unknown shared secret" means an unknown shared secret between the user and the computer system that (a) is created for authentication and/or authorization purposes, (b) is unique to that logon attempt, (c) is comprised of (i) random cognitive logon variables that are unknown to the user, (ii) accurate responses to the variables that will be necessary to create the required logon credentials for that logon attempt, and (iii) data that will be derived from evaluating the user's responses and cognitive function, and (d) can be used to further authenticate the user beyond that of a known shared secret.

"Variable" means a random cognitive logon variable, key random cognitive logon variable, and/or, if applicable given the context, an outside cognitive variable.

Figure 1A:
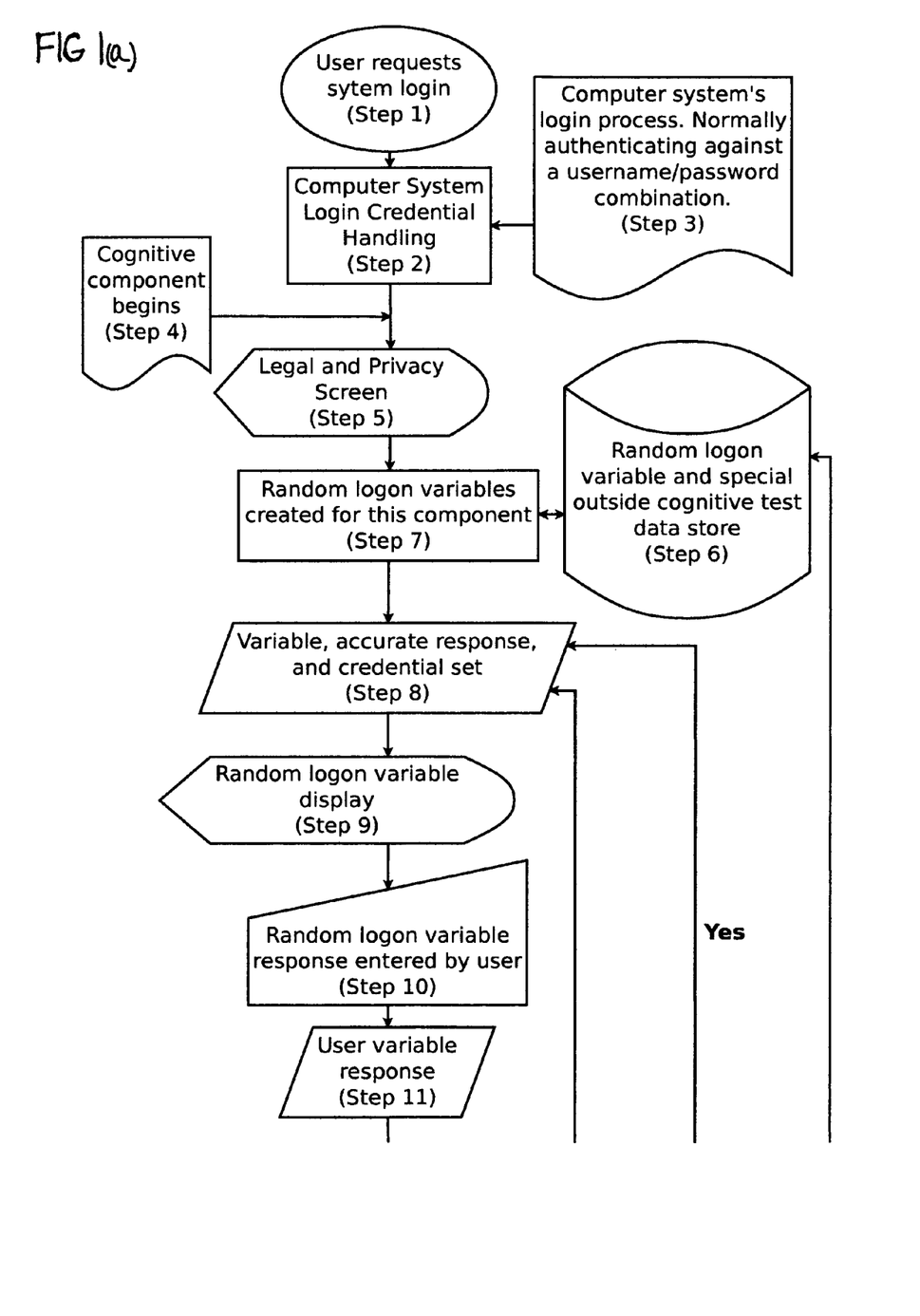
FIGS. 1a, 1b, and 1c are partial views that collectively constitute a flow diagram representing the important steps and processes of the OPTION A, OPTION B, and OPTION C embodiments of the invention, illustrated by way of example and not limitation.
Figure 1B:
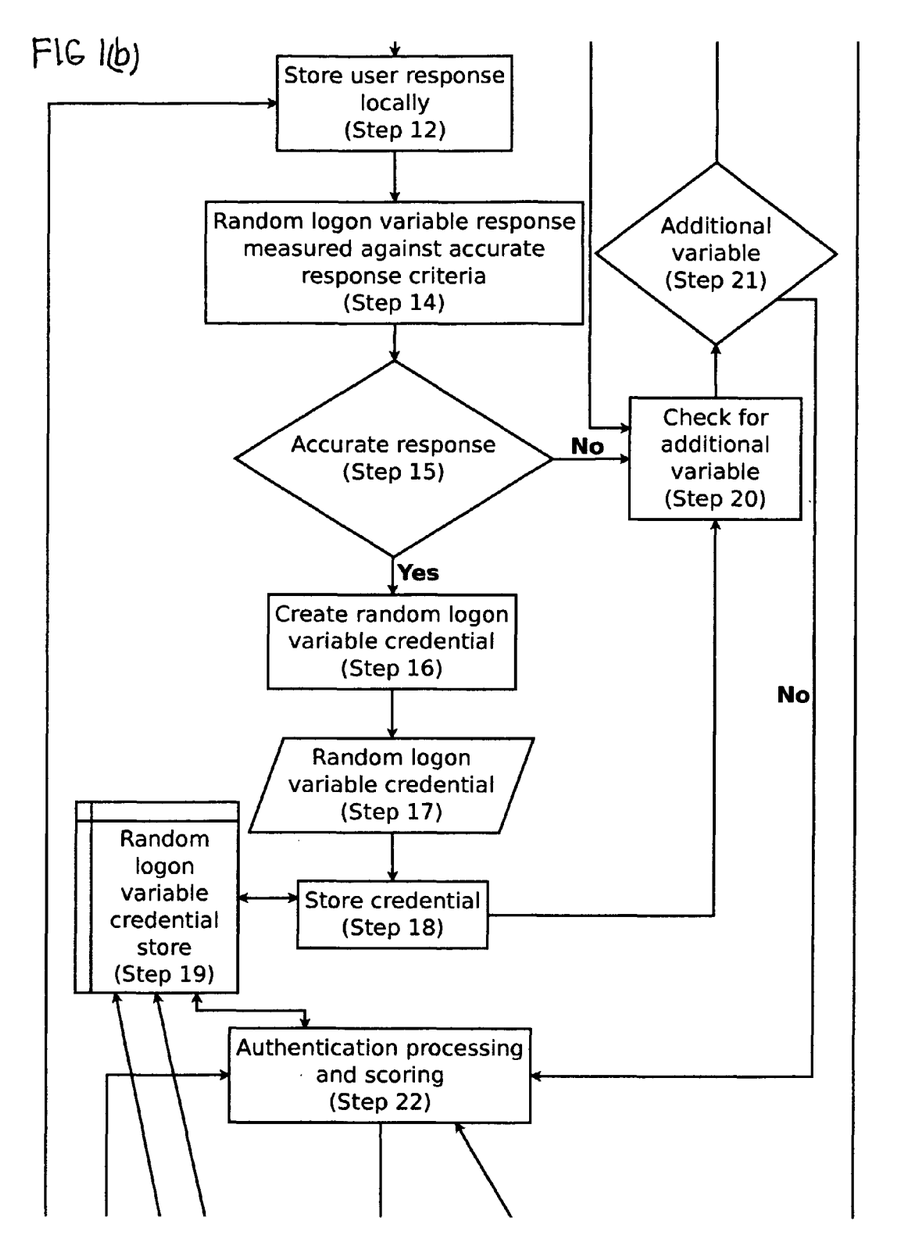
Figure 1C:
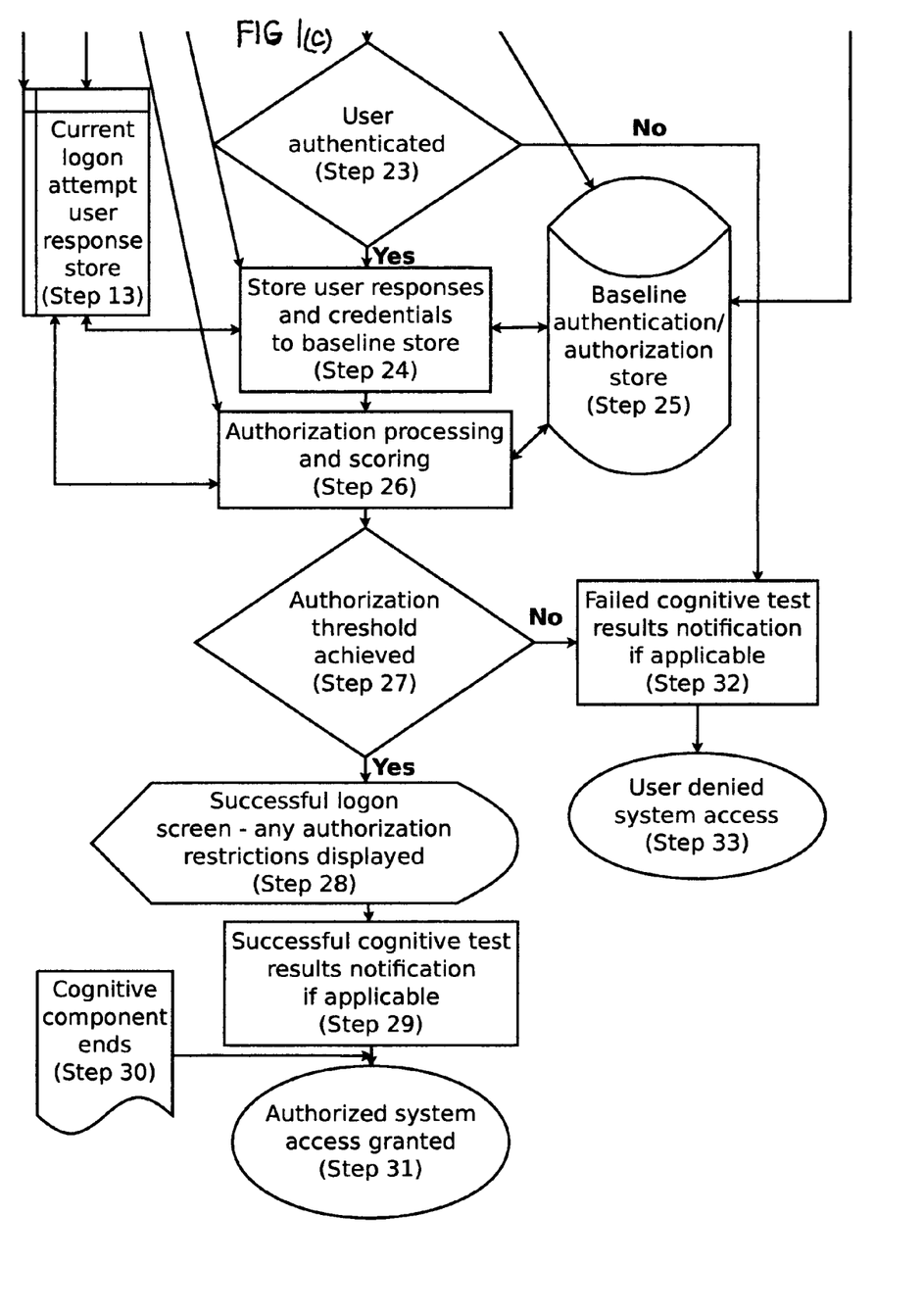

FIGS. 1a, 1b, and 1c—Options A, B, and C

OPTION A is designed to ensure that the user meets a threshold level of cognitive thinking and mental alertness (as determined by the administrator of the computer system) in order to gain access to the computer system. For OPTION A, accurate means an exactly correct match. This component is designed to validate the user's cognitive skills and mental alertness at time of the logon attempt by requiring an exact matching response in order to create a cognitive logon credential. It is used in situations where there is little or no room for error in the performance of job duties (e.g., air traffic controllers or commercial airline pilots).

OPTION B, meanwhile, allows for a broader range of accurate responses for authentication and/or authorization purposes. For this component, accurate means an exactly correct response or a response deviating only slightly from or within acceptable limits of an exact match. For example, the computer may present the following variable: "Fill in the spaces with another word for automobile that begins with the letter 'C.'" CAR would be the exact matching response the component is looking for, but the word CAB could also be viewed as within acceptable limits.

OPTION C, alternatively, includes all responses to the variable. The creation of outside credentials is perfunctory in nature and requires only an abbreviated process, because the user's responses will not be evaluated or retained for longer-term purposes or used for the authentication process and the computer system's authorization levels are not determined by the responses. For example, OPTION C may involve a special cognitive test created by an outside mental health company that will be evaluated by a mental health professional who will be provided with the test results. The important thing is such a situation is to get the user to take the complete test by responding to all the questions so that the responses may be evaluated. All responses have merit for evaluation purposes: correct responses, nearly correct responses, and incorrect responses. The responses are only used minimally for session management purposes and not at all for logon purposes. The steps and processes involved in this application are represented in STEPS 4-21 and 26-32.

In OPTIONS A, B, and C, the user requests a logon session by entering his username and password (which usually comprise the known shared secret between the user and the computer system) into the computer at STEP 1. The computer then initiates the authentication/authorization process at STEP 2 that enables it to rapidly search, identify, and verify the user's identity and which parts of the computer system the user is authorized to access. This is critical to meeting security and compliance requirements.

Once the regular authentication process is completed at STEP 3 (through the standard username/password combination and/or through additional steps, if required by the system), the component/thought-directed user interface begins STEP 4 by presenting a computer screen at STEP 5 that provides required or optional legal and privacy language.

Next, the component accesses the random cognitive logon variable database at STEP 6, in which there are approximately 2000 to 3000 (and possibly more) variables stored and arranged into subsets by, among other criteria, the type of general and specific skills involved in the variable, the difficulty level of the variable, and whether the variable is a key random cognitive logon variable. The database may also contain outside cognitive variables. The database could be self-contained within the component, or the component could access a database located outside the component. Other associated information could be imported into the variables database from an outside database, such as an employer's database.

At STEP 7, the component begins the process of randomly selecting random cognitive logon variables. Each variable is tagged with an accurate response and the cognitive data for that variable (i.e., the general classification and the specific cognitive skills to be measured as well as the difficulty level of the variable), thereby determining the cognitive logon credentials that will be required for that component. These variables, the related cognitive data tags, the accurate responses to these variables, and the resulting required credentials that may or may not ultimately be created are now part of the component at STEP 8, but all of these are still unknown to the user at the time of logon and are undeterminable in detail until the logon process is complete. A set of outside cognitive variables could be imported here as well. A cognitive logon credential can be the accurate response itself (for instance, it could be the word CAR, as in the above example). If an outside test is involved, the outside credential would be the outside response made, normally any measurable response given.

At this point, STEP 9, the user is presented with the first random cognitive logon variable. This is where the neural coding measurements are initiated that will later be incorporated into the four level multi-factor process. Because both the variables and the accurate responses are unknown to the user, the user must utilize cognition to make an accurate response to the variable. In order to successfully complete the set of variables, the user must demonstrate some or all of the following cognitive skills: attention, awareness, comprehension, concentration, decision making, executive function, judgment, logical thinking, long-term memory, perception, problem-solving, planning, math skills, reasoning, short-term memory, symbolic thinking, verbal recognition and verbal memory, and visio-spatial skills.

The following example is used for illustrative purposes: OPTION A—random cognitive logon variable: "Fill in the following spaces with another word for CAR that has ten letters, begins with the letter 'A', and ends with the letter 'E': _ _ _ _ _ _ _ _ _ _."

When the user has thought up what his response will be, he transforms the thought in his mind into a response by entering it on the device's screen at STEP 10. The neural decoding measurements to be used in the four level multi-factor process, if applicable, begin at this point. In this example, the correct response would be AUTOMOBILE. At that exact moment, while the thought of the word AUTOMOBILE is in the user's mind, if only for an instant, the computer system reads and captures that response at STEPS 11 and 12.

There was no reason for the user to be thinking of the word AUTOMOBILE, as opposed to any other word in his vocabulary, at the moment before the variable was presented. The user had not previously been informed that the word AUTOMOBILE was his username or password or that it would otherwise be required at the time of logon. The user did not know the variable ahead of time and therefore could not have accurately known, predicted, or memorized what the accurate response was going to be. The variable is not a multiple choice question, where the accurate response is presented to the user as one of the options. The variable does not concern a specific life event or experience of the user. The word AUTOMOBILE does not appear in the variable or on the computer screen at all prior to the response. The user was certainly familiar with the word AUTOMOBILE. Perhaps he already used that word in a sentence that very day, or perhaps he drove his AUTOMOBILE to work. But he may never have thought of that word in exactly this manner before, and the only reason it was in his mind at the exact moment he made his response was because of the variable presented to him and his utilization of cognition. Only the exact matching response, the word AUTOMOBILE, will let the component create the required random cognitive logon credential at the right moment. This illustration demonstrates the cognitive nature of the component.

If there is a question as to whether or not the word AUTOMOBILE is in the user's brain at that exact moment, but not really in his mind, then why did the user respond with that exact word at that exact moment? After all, the user probably had somewhere between 20,000 and 30,000 words in his vocabulary (and therefore in his brain) at that point.

To illustrate further, and to show how a variable can have a range of difficulty levels, consider the different ways the random cognitive logon variable used in the previous example could have been presented: "Fill in the spaces with another word for AUTOMOBILE which has three letters: _ _ _." Or, it could be modified to: "Fill in the spaces with another word for AUTOMOBILE that begins with the letter 'C'"; or "Fill in the spaces with another word for AUTOMOBILE that has three letters, begins with the letter 'C', and ends with the letter 'R'"; or, without showing any number of spaces, "What is another word for AUTOMOBILE?"

Alternatively, an outside cognitive variable could be presented to the user at STEP 9, and the user would make his outside response. This process is much more abbreviated in that there is no meeting of the minds required, the data is not retained, and the outside response is not utilized for logon purposes and is deemed to be accurate for outside credential creation purposes.

The response or outside response can be entered into the computing device through a variety of interfaces, including a keyboard, virtual keyboard, voice-activated input, or some type of user brain computer interface (including a brain-reading headset).

Returning to the diagram, at STEP 11, the response or outside response is read by the component, captured at STEP 12, and then sent to short-term storage at STEP 13 along with the neural coding and, if applicable, other associated information collected, awaiting later authentication/authorization processing.

The neural coding and decoding measurements of how long it takes the user to read the variable, think up his response, and enter his response (i.e., response time) create the ability to measure and record coding and decoding relating to the responses in aggregate, by separate steps, and even by the specific type of skills and sub-skills required to accurately respond, as well as how the user organizes his responses. In addition, these neural coding and decoding measurements can be recorded and classified by the level of difficulty of the variable presented for response. This process provides the opportunity to observe the user in real-time and over a longer period of time based on previously stored data. The link between stimulus and response can be studied from two opposite points of view: the neural coding map from stimulus to response (i.e., presentation of the variable to initiation of the variable response by the user), and the neural decoding map from response to stimulus (user creates and enters a response, which is read by the component). Both perspectives can be measured by linear stimulus-response or other means and allow for measurement by the type of cognitive skills involved, and can then be used for validation, evaluation, and monitoring purposes when integrated into the four level multi-factor process as an additional means of cognitive/behavioral biometric verification.

The response to the cognitive logon variable is measured against the accurate response criteria at STEP 14 that was brought forward from STEP 7 and, if it is determined to be accurate as defined by that application at STEP 15, there is a meeting of the minds and the component transforms the cognitive logon response (the manifestation of the thoughts of the user) into a required cognitive logon credential at STEP 16. The credential at STEP 17 and the associated information, if any, is sent at STEP 18 for short-term storage at STEP 19 until all the variables for that component have been presented.

The transformation of the response into a credential serves multiple purposes. First, it allows for differing authentication/authorization requirements between employers. Second, it provides an easy way to capture associated information relating to the response itself. Third, it facilitates long-term storage and recordkeeping for such information. All of the above facilitate the four level multi-factor process and create the ability to evaluate neural coding and decoding and other associated information relating to the response (i.e., elapsed time).

The component presents the user with random cognitive logon variables that require cognition and are designed to elicit specific responses, and the accurate responses are transformed into (and become and formulate) the cognitive logon credentials required for that component. Because the computer is awaiting the exact matching response (or, if applicable, one of the matching responses), that exact response must exist in the user's mind and cognitive thoughts at the moment the user's response is entered onto the computer screen, if only for a moment. That thought, initiated by the cognitive nature of the random cognitive logon variable and arrived at by the user utilizing his cognitive skills when turned into a response, can be read by the computer and, if accurate, transformed into a required cognitive logon credential. Therefore, in applications where the definition of accurate means an exact match, the component involves and requires a meeting of the minds between the computer and the user in order to jointly create the cognitive logon credentials, required for that specific component. Further, because there is a meeting of the minds, the component can be considered to be reading what is in the user's mind and/or thoughts (i.e., performing further neural decoding) at the time the user makes his response. This includes the steps and processes at STEPS 11, 12, 14, 15, 16, and 17. Outside credentials do not require a meeting of the minds.

A set of random cognitive logon variables could be created for use in a component that will be presented to a user who has been determined to have some form of cognitive or physical impairment. These variables would allow the user to successfully complete the logon requirements by accurately responding to a set of specially designed and targeted variables that have been developed for use with that specific impairment.

Once the above process has been completed for the first variable and a credential has been created and stored at STEP 19, the component makes a decision at STEP 20 as to whether another variable is to be presented. If so, the next variable is sent for presentation to the user at STEP 21, and the same process is repeated until all the variables are complete or the user has been denied access to the system for another reason.

If the response to the first variable or any other variable in the set is incorrect as determined at STEP 15, that message is sent to STEP 20. The component could require 100% accurate responses, in which case the logon attempt is deemed to have failed after the first inaccurate response. A notice of the failed logon attempt may be presented to the user at that point, and an email may be sent to the system administrator or an outside party at STEP 32. Alternatively, the component could require less than 100% accuracy, in which case further variables are presented until the maximum number of inaccurate responses is reached or the full set of variables is presented.

When all variables or outside variables have been presented to the user, all responses have been made, and all credentials have been formed for the logon attempt, the component is ready to begin the authentication/authorization processing, if applicable.

The normal authentication process is highlighted by the fact that authentication involves a shared secret between the user and the computer system. At least one shared secret has been presented to the computer system already at STEPS 2 and 3, and the user has been authenticated or the component never could or would have been activated. The component introduces a new dimension to the computer logon process that provides the ability to validate, evaluate, and monitor the cognitive skills and mental alertness of the user at the time of logon by requiring the user make accurate responses to the variables. The data from that process temporarily stored at STEPS 13 and 19, along with the data from prior logon attempts for that user which has been permanently stored at STEP 25, is now utilized in the authentication/authorization process at STEPS 22 and 26.

At the time the component is initiated, an unknown shared secret is created between the user and the computer system for authentication and/or authorization purposes. This unknown shared secret is unknown to both the computer system and the user until all responses are made and analyzed. The component utilizes up to a three level multi-factor analysis, as determined by the computer system administrator, to complete this additional authentication and/or authorization process. The additional unknown shared secrets for authentication/authorization purposes includes the steps and processes at STEPS 6-11, 14-17, 22-23, 25-28, and 32.

In addition, the component will use data concerning the cognitive logon credentials actually created during that process for authorization purposes in accordance with the employer's specific authorization criteria stored at STEP 25. This allows the employer to impose the company's workplace expectations, which may result in restricting or even denying access to the user based on his responses. The component utilizes up to a three level multi-factor analysis, as determined by the system administrator, to complete this process.

When the logon process has been completed, the additional previously unknown shared secret(s) will have been revealed, comprising what the user and the component will then know—measured in real-time, which makes the component dynamic and three-dimensional in that it incorporates an additional authentication process, determines the authorization level granted for that logon session, and stores data for a specific user on an ongoing basis for user validation, evaluation, and monitoring purposes.

When taken together, the authentication/authorization analysis process is a four level multi-factor process. Certain levels of that process, or certain portions of specified levels of that process, operate as follows.

Example: For a bank teller position, the employer's authorization policy requires 9 out of 10 accurate responses to the random cognitive logon variables presented, utilizing basic difficulty level variables, and requires 100% accuracy in math skills. The user must not deviate significantly from his normal cognitive skill level in specified categories as measured against his baseline levels, and his stronger and weaker skills must not deviate significantly from his skills as demonstrated in prior logon attempts.

Level 1—Authorization Processing

The first level of the four level multi-factor process involves authorization processing, and is based on the raw number or percentage of accurate responses made to the random cognitive logon variables by the user, or the raw number or percentage of cognitive logon credentials created by the user during that logon attempt. For example, an employer's authorization policy requires at least 9 out of 10 responses to be accurate (a correct or an exact match) for each logon attempt, utilizing basic difficulty level variables in order for the user to get his/her normal authorizations. Said another way, there is a threshold requirement of 90.00% to gain access to the computer system.

Level 2—Authorization and Authentication Processing

The second level of the four level multi-factor process involves authentication and authentication processing. The authorization processing establishes a threshold requirement for access to the computer system based on an additional restriction. The user must reach a certain threshold level in certain general skills categories the employer considers critical to that job. In addition, it establishes the first level of authentication testing by collecting information regarding the responses in a broad range of cognitive skills categories, and by starting to build a baseline for that user that will eventually reveal the user's cognitive fingerprint. Using the same example, the employer's authorization policy also requires 100% accuracy in a general skills category on each logon attempt. In this case, every math variable must be responded to accurately. A variable is first classified by a general category, then further classified by the specific skills required to accurately respond to that variable (i.e., judgment, decision making, symbolic thinking, and reasoning) and by the difficulty level of the variable.

Level 3—Authorization and Authentication Processing

The third level of the four level multi-factor process involves authorization and authentication processing. The authorization processing allows the employer to establish a threshold level of cognitive function in a broad range of specific skills that are critical to that user's job and that contribute to that user's overall cognitive state and mental alertness at the time of logon. It also creates the next level of authentication processing by allowing the computer system to validate that the user's responses, which indicate his stronger and weaker cognitive skills, correlate strongly to his stronger and weaker skills as demonstrated in prior logon attempts. The results of this next level of authentication continue the process of revealing that user's individual cognitive fingerprint.

Using the same example, the employer's authentication policy requires that the variable responses also be compared to the user's historical baseline data regarding a broad range of cognitive skills collected over a number of logon attempts, to determine how mentally alert the teller is when he/she reports to work by demonstrating such cognitive skills as judgment, problem solving, and critical decision making. Information collected in this regard might also be usable for other purposes; for example, as part of an annual job performance review. One way to accomplish this is to compare data collected during the current logon attempt against the user's baseline data to determine whether the user's cognitive function is at or above the user's threshold level on critical skills. For example, the threshold level could be expressed as 90.00%, measured by the percentage of accurate responses made in a broad range of skills categories, or not more than 150% of elapsed time based on the user's normal neural coding and decoding measurements, for example. This same data can be used for authentication purposes by measuring the correlation between the stronger and weaker cognitive skills exhibited by the user during the current logon attempt compared to the user's historical baseline data. A significant deviation could indicate a negative authentication. Each random cognitive logon variable has a cognitive skills tag attached to it that indicates the cognitive skills measured by that variable as well as the difficulty level of that variable.

Using the bank teller position again, consider for illustrative purposes the basic example of a random cognitive logon variable: "Assume you owe five different customers $8.89 each from the money or check they gave you. Show the five ways you could give these customers back the money you owe them."

Since this is a general math question, any response that did not result in the correct change being returned would be incorrect (for instance, the user enters a number of specific coins and bills that do not add up to $8.89.) If this is the only incorrect response, the employer's authorization policy detailed earlier allows one incorrect response and therefore the 9/10 threshold level 1 authorization processing would be met. However, the threshold for level 2 authorization processing requires a 100% accurate response rate to general math skills questions. Since the 100% requirement would not be reached, access would be denied.

But within this variable, which is classified as a math variable for general classification purposes, there are a number of other cognitive skills that can be measured and that will be used to build the cognitive skills baseline data for this specific user that is maintained at STEP 25. This baseline data will provide a point of comparison against the current logon process for authentication/authorization purposes, and will, over time, result in the user having revealed his own unique cognitive/behavioral biometric fingerprint that can be used for biometric authentication purposes. Each person has stronger and weaker cognitive skills, and each user thinks in his own way, interacts with the computer in his own way, and responds to the variables in a different way, even though his responses may all technically be accurate. For instance, in the current example, as long as the correct amount of change is given, $8.89, the response is technically accurate. However, the way each user decides to return the amount owed (i.e., the actual number of bills and coins) indicates more about the thinking pattern of that user, particularly if the baseline processing involves a comparison of the cognitive skills exhibited by the user during this logon attempt compared to the user's own cognitive skills exhibited in prior logon attempts—not how he is thinking compared to a different user, but how he is thinking compared to how he normally thinks. For authorization and mental health evaluation purposes, the component wants to know how the user is thinking at that moment compared to how he normally thinks. For authentication purposes, the computer system wants to know that the user's stronger and weaker skills as exhibited in current logon attempt strongly correlate to those same skills as exhibited during previous logon attempts.

At this point in the logon process, authentication has been verified at least once already, but an extra layer of protection is now available because the responses being made can be compared to the responses the user would be expected to make based on perhaps hundreds or even thousands of logon attempts. This additional authentication process could prove critical someday. Within the variable itself, which is classified as a general math skills question in this example, the cognitive skills of symbolic thinking (one dime=ten cents=two nickels), problem solving as to how much in coins and bills to give back (two dimes and a nickel or a quarter) and verbal reasoning ("Show the five ways you could . . . "). Did all the coins and bills shown add up to the right amount? Did the user give the same type of coins and bills back to each customer or was it paid out a different way to each customer? Did they pay it out the most customer-friendly way each time (least amount of coins)? The variable did not specify whether or not all types of coins and bills are always available. Ultimately, the method would depend on the change the teller actually had available, so figuring out five different ways might be good for the teller to know. In other words, all of the responses are correct as long as they add up to $8.89, but the way the user would pay it out demonstrates the way he thinks when responding to such a variable and how he would be expected to respond to a similar variable at some future point in time. Software that uses brain scans to determine what items people are thinking about has already been developed, and the results indicate that "the more detailed the thought is, the more different the brain scan patterns get from one person to another, indicating different people have different associations for an object or idea." S. Begley, "Mind Reading Is Now Possible," *Newsweek*, Jan. 21, 2008. For example, the word "dog." Further, "[t]he way that people interact with information is incredibly unique; if you can find a way to capture that, then you can measure someone's identity." D. Dinely, "COGNETO: To Identify and Beyond," *Infoworld*, May 25, 2007.

Studies have shown that measuring some skills in an aggregate sense is not always reliable. For example, it is difficult to measure decision-making skills in the aggregate because there are many factors involved in most decisions. It is nearly impossible to ascertain whether the exact same cognitive skills are required in making two different decisions, and therefore the measurement may be unreliable. It may be necessary to measure each cognitive skill individually rather than the aggregate. By comparing a grid of skill levels exhibited during the current logon process to a grid composed of historical baseline data, the pattern and consistency of the user's stronger and weaker cognitive skills can be verified.

Level 4—Authentication Processing

The fourth level of the multi-factor process is the last level of authentication processing. It involves a broad evaluation of the reading skills, demonstrated preferences, and solving techniques exhibited by the user during the current logon attempt compared to those exhibited during previous logon attempts. The consistency of the user's responses and key cognitive logon responses made during the logon attempt, and the user's decision-making and reasoning skills and demonstrated preferences, are compared to the user's baseline. In addition, the responses are compared to the user's neural coding and decoding baseline maps as recorded during the four level multi-factor process and the user's cognitive biometric fingerprint as revealed over a period of time.

The computer system will select certain key random cognitive logon variables for each user at the beginning of the baseline-building process. These variables are unique to that user and will be presented periodically. The user's current responses will be compared to the user's prior responses to those same key random logon variables. The responses must be similar and consistent. The key random cognitive logon variables and the key cognitive logon responses will remain unknown to the user, but will be known by the component after accessing the baseline data.

The following criteria will be utilized during level 4 authentication processing:

1. Reading skills and preferences displayed (including comprehension) to basic, moderate, and difficult variables.

2. Consistency of responses to key random cognitive logon variables.

3. Deductive reasoning skills displayed.

4. Inductive reasoning skills displayed.

5. A comparison of responses made during the current logon attempt, if any, regarding judgment, reasoning, and decision making within a risk-based context, as measured against previous responses within a similar risk-based context.

6. A comparison of the data derived from the current logon attempt against the user's neural coding and decoding baseline maps created for the four level multi-factor cognitive response and evaluation process for user biometric verification purposes.

7. A comparison of the data derived from the current logon attempt against the user's cognitive biometric fingerprint as revealed over a period of time in the four level multi-factor cognitive response and evaluation processing for user verification purposes.

Reading and verbal skills are primary to solving a cognitive skills variable, because if the user cannot read the variable correctly, the user cannot be expected to make an accurate response. Individuals create their own variable responses in a manner unique to them. Knowing how a user has addressed similar variables and key cognitive logon variables (demonstrated preferences and solving techniques) in prior logon attempts indicates how the user might be expected to respond to a variable or key random cognitive logon designed to test the same cognitive skills, and to similar variables set up with minor variations using different numbers, colors, shapes, etc. Users are not normally even aware that they have demonstrated these preferences in their responses.

Using a basic example for illustrative purposes: Fill in the blanks on the screen using the following shapes, putting them together in groups of three: ◇△○□△△○□○◇□◇.

The user's response: ○○○△△△□□□◇◇◇.

This format could be used to establish a key random logon variable for this user, modifying it by simply changing the order of the same shapes, by changing the kinds of shapes included, by increasing or decreasing the number of different shapes used, or by changing the number of each shape used, which would change the number in each grouping. However, the basic scope and format is the same.

Some users will arrange the shapes reading from left to right. Others will not. The order in which the user groups the shapes together does not matter, as long as they are arranged in groups of three, the response is correct, and an elapsed-time measurement has been made. However, the order of the grouping tells us something. Does the user always arrange the grouping in the order in which they first appear going from left to right (which in this case would have been: ◇◇◇△△△○○○□□□), or in some other way, such as the user's response in this example. The response is also compared to all of the user's previous answers for that same key cognitive logon variable. Once a significant number of such demonstrated preferences has been made a number of times, those preferences can be used to create a baseline, which can then be used along with other data as an additional authentication process.

When the level 2, 3, and 4 authentication processing outlined above, as applicable, has been completed at STEP 22 using data from STEPS 13, 19, and 25, the result is sent to STEP 23 along with a tag indicating whether the user was authenticated. If so, the data obtained in the current logon attempt is accumulated at STEP 24 and will be transferred to permanent storage at STEP 25 and the authorization process can commence. If not, the user will be notified of a failed logon attempt at STEP 32.

Some employers may only want to utilize the component for authorization and not for authentication purposes, or there may not yet be enough baseline data available for a given user for the authentication process to available. In such instances, only the authorization processing will be performed, and not the authentication process. In such cases, the user can be deemed to have been authenticated so that data can be sent to STEP 25 to start or continue to build a baseline, for example. The result sent from STEPS 22-23 will be coded as authenticated and is therefore ready for authorization processing.

The level 1 through level 3 authorization processes, as applicable, begin at STEP 26. The authorization process may involve data from STEPS 13, 19, and 25. Associated information may be imported into the baseline authentication/authorization database or the component may access an outside database, such as an employer database.

It may be that only level 1 authorization processing will be conducted. If so, this data would be available from STEP 19. However, for level 2 and 3 authorization processing, it will be necessary to access the current logon data that was in temporary storage at STEP 13 and has now been or will be transferred to permanent storage at STEP 25, as well as the permanent baseline data already stored there.

Once the level 1, 2, and 3 authorization processing, as applicable, has been completed at STEP 26, this data is analyzed and a determination is made as to whether the user's normal authorizations will be restricted or denied at STEP 27. The determinations made in the four level multi-factor authentication/authorization processing are formalized for presentation to the user, and the component gives formal instructions to the computer system to initiate the components' last few remaining actions at STEP 27. If the user has been authorized as a result of the level 1 through level 3 authorization processing, as applicable, and is to be granted access to the computer system with or without full normal authorizations, the successful logon screen is presented to the user, along with an explanation of any authorization restrictions at STEP 28. The results of a successful logon attempt may be forwarded to an interested party at STEP 29. The cognitive component ends at STEP 30 and the user is logged on at STEP 31.

When the cognitive response and evaluation process has been applied to a single user a significant number of times over a significant period of time, causing the cognitive biometric fingerprint to be revealed, and the neural coding and decoding of the user has been successfully mapped, the four level multi-factor cognitive response and evaluation process is demonstrating machine learning (i.e., artificial intelligence) by automatically learning to recognize complex patterns and make intelligent decisions based on data contained in the database and evolve behaviors based on empirical data. The authentication/authorization process outcome depends on the data derived during the current logon process, as well as the new knowledge created by the component through evaluation of that data; in other words, the data and the outcome of the multi-factor process are unknown to all parties in detail until the multi-factor process has been completed and the component has made its decision. This includes the steps and processes at STEPS 22-29 and 32. Because of the cognitive nature of the component and the four level multi-factor cognitive response and evaluation process, in which the neural basis of the user's cognitive skills and processes may be assessed, the component allows insight into the user's brain processes.

The user and the component can both be considered to be exercising thought-directed control, as the component determines the random cognitive logon variables to be presented and the user must create the thought in his mind that initiates the response which, if accurate, is transformed into the cognitive logon credential for that specific variable. Neither the component nor the user can unilaterally create a cognitive logon variable credential. This includes the steps and processes at STEPS 7-12 and 14-17.

The component can be considered to be a thought-directed user interface, involving self-checking and self-completing software that controls the logon process, the outcome of which is totally dependent upon the user's responses to a set of computer-selected cognitive variables that represent the manifestations of the user's thoughts. This includes the steps and processes at STEPS 8-11, 14-17, and 22-28.

By its very nature, the four level multi-factor process provides an additional layer of security to the computer system, thereby making the computer less vulnerable to hacking or other unauthenticated and unauthorized access by would-be intruders who may be attempting to compromise the computer system and/or achieve identity theft. The process requires a keystroke(s) or virtual keystroke(s) and an accurate response from the user to gain access to the computer system. The intruder cannot provide the keystroke(s) and, even if he could provide it, would have no idea what keystroke(s) would need to be made, as the random cognitive logon variable and therefore the cognitive logon response to it are unknown to him as well. The process would also address theft through social engineering. This includes the steps and processes at STEPS 4-30.

Because the user must demonstrate a threshold level of cognition to qualify for the authorizations normally allowed, the computer system's integrity is enhanced and the user's employer is better protected from liabilities arising out of the actions of employees during the course of business. In addition, users will be safer conducting financial transactions over the internet and performing other actions where personal and confidential information could be compromised or where the user could otherwise be subjected to identity theft.

Because the results of the four level multi-factor process for a user may be stored and maintained for a significant period of time, such data could be used as an indicator of brain trauma, or mild cognitive decline, and could indicate the early symptoms of Alzheimer's disease or other diseases or conditions affecting the brain and/or mind of the user. In some cases, it may even indicate a much more serious acute condition, allowing an early intervention opportunity, and might even prove useful in the diagnosis, ongoing evaluation, and treatment of some cognitive diseases. A user may have had a stroke or heart attack and a combination of OPTION A, OPTION B, OPTION C, and a grouping of standardized cognitive tests could be combined into a rehabilitation program for use while the user is recovering. In such cases, the user's established baseline could not be used and a new baseline would be started which could then be compared to previous baseline data to measure rehabilitation progress.

If the user fails the authorization process, the user is denied system access at STEP 33 and is returned to the initial logon screen.

Option C

As described above, OPTION C is utilized in situations in which, for instance, an outside test, such as a cognitive evaluation test ordered by a doctor, is being administered to the user through an outside component. The test could be imported into the component through the variable storage database at STEP 6. Such a test is not used for authentication or authorization purposes, but would simply be administered after logon and as such would be subject to an abbreviated process (for instance, the creation of logon credentials is only perfunctory in order to sustain the process of presenting the variables to the user.) For OPTION C, accurate means any response given, as all answers may be valuable in evaluating cognitive impairment whether they are correct or not.

Figure 2A:
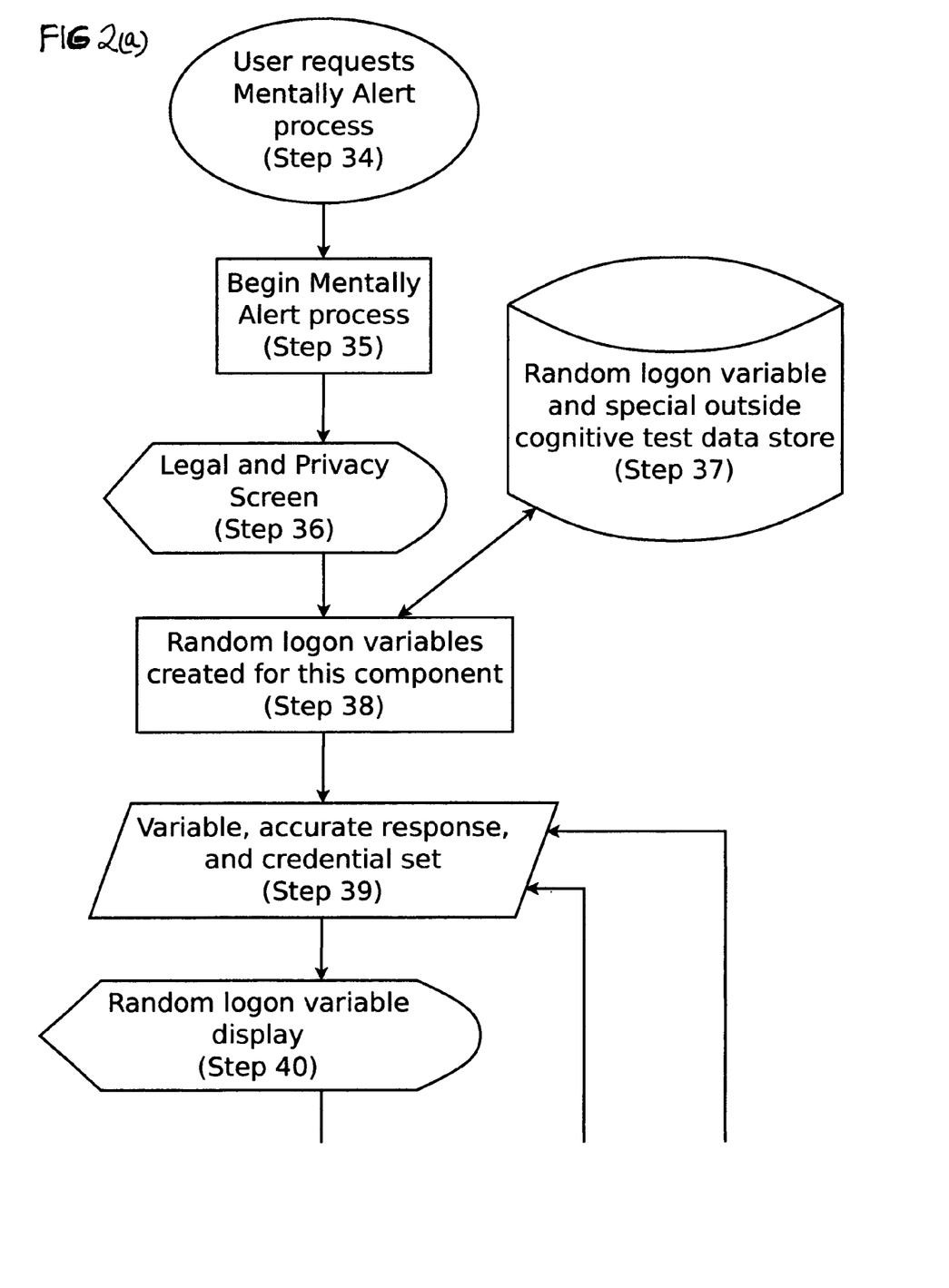
FIGS. 2a and 2b are partial views that collectively constitute a flow diagram representing the important steps and processes of the OPTION D embodiment of the invention, illustrated by way of example and not limitation.
Figure 2B:
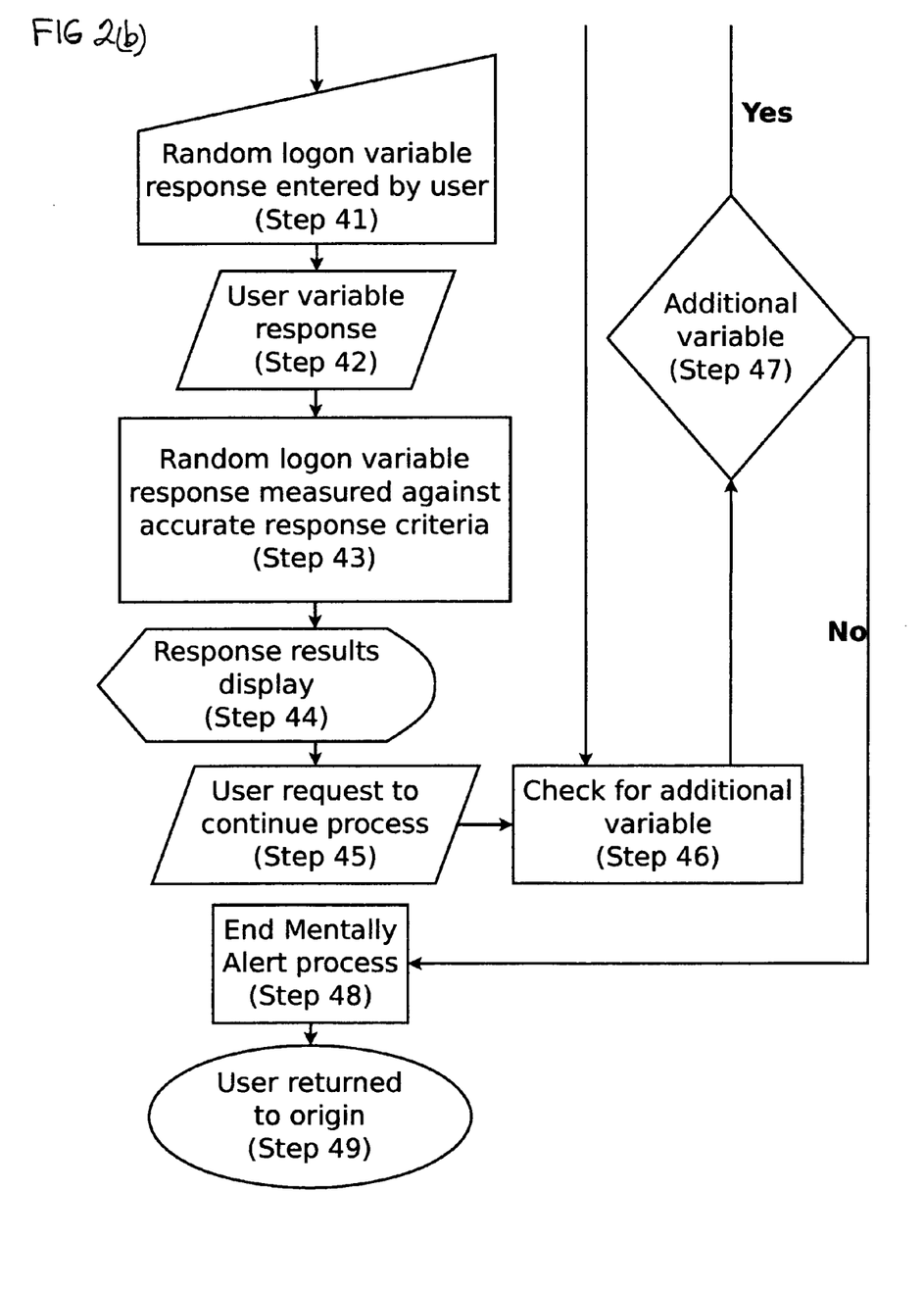

FIGS. 2a and 2b—Option D

OPTION D is an abbreviated process that includes the steps shown in FIGS. 2a and 2b. This application is voluntarily elected by the user by clicking on the "Mentally Alert" (or similar) button located on a computer screen (which may be part of a website). The user is presented with a set of variables to which the user is required to provide an accurate response. For OPTION D, accurate means an exactly correct match. The word "Correct" or "Incorrect" flashes on the computer screen after each response and the user then advances to the next variable until all variables have been completed. The application is then ended at STEP 48 and the user is returned back to the original screen. The user normally has the option to end OPTION D at any time, at which time he is returned back to the original screen. The same variables database that is used for OPTIONS A, B, and C is also used for OPTION D. OPTION D is designed to provide the user with the ability to validate, evaluate, and/or monitor his mental alertness (and, if applicable, to decide whether or not to maintain the existing session) through a series of questions and/or mental exercises that measure his responsiveness, perception, quickness, concentration, and other factors.

While the invention has been described with reference to illustrative embodiments, this description is not intended to be construed in a limiting sense. Various modifications to the illustrative embodiment will be apparent to those skilled in the art upon reference to this description. It is therefore contemplated that appended claims will cover such modifications or embodiments as fall within the scope of the invention.

We claim:

1. A computer program product comprising at least one non-transitory computer readable medium tangibly embodying a computer readable program within a computer system having internet and/or intranet connectivity, wherein the computer readable-program, when executed: (i) prompts a user with a set of one or more random cognitive logon variables; (ii) receives input from the user comprising a response to each random cognitive logon variable; (iii) measures each response against an accurate response criterion independently established for each random cognitive logon variable without deference to a user's previous response; (iv) transforms each response that meets the accurate response criterion into a cognitive logon credential; (v) generates data output regarding the cognitive logon credential(s); (vi) initiates a prescribed action based on the cognitive logon credential(s), said action including instructing the computer system to grant or deny access to the user to all or part of the computer system; (vii) and stores data in, and retrieves data from, a target storage area.

2. The computer program product of claim 1, wherein, during an active logon session, the computer readable program further prompts the user with a series of one or more random cognitive logon variables at certain regular, periodic, or user-initiated intervals.

3. The computer program product of claim 1, wherein the prescribed action further includes granting permission to continue an active logon session with or without restrictions based on the cognitive logon credential(s).

4. The computer program product of claim 1, wherein a required number of cognitive logon credentials is expressed as a numeric score, either as a raw number representing a total number of cognitive logon credentials or as a percentage representing the total number of cognitive logon credentials divided by a total number of random cognitive logon variables presented to the user.

5. The computer program product of claim 4, wherein the prescribed action is based upon the numeric score with respect to: (a) all random cognitive logon variables; or (b) only the random cognitive logon variables useful for measuring one or more specific cognitive skills; or (c) a combination thereof.

6. The computer program product of claim 4, wherein the numeric score is further based on an expected response time from the user and the numeric score is adjusted based on an actual response time by the user.

7. The computer program product of claim 1, wherein the data regarding the cognitive logon credential(s) is generated by the computer readable program over a course of multiple logon sessions and is used to identify and establish a baseline level of cognitive function.

8. The computer program product of claim 1, wherein the responses to the cognitive variables for a particular logon session or sessions are further measured against a baseline level of cognitive function to determine whether and to what extent the cognitive logon credential(s) are improving, diminishing, or remaining static over a period of time.

9. The computer program product of claim 1, wherein, upon logon or during an active logon session, the user is additionally presented with a series of one or more outside cognitive variables, which are treated as random cognitive logon variables except that an accurate response to an outside cognitive variable is transformed into an outside credential and is not used as a basis for granting or denying the user access to the computer system or permission to continue an active logon session.

10. The computer program product of claim 1, wherein the cognitive logon credential(s) are accumulated over a period of multiple logon sessions and form a basis for one or more cognitive biometrics which provide a cognitive biometric fingerprint unique to the user.

11. The computer program product of claim 10, wherein the cognitive biometric fingerprint is used to recognize, authenticate and/or authorize the user and to grant or deny the user access to all or part of the computer system or permission to continue an active logon session with or without restrictions.

12. The computer program product of claim 10, whereby the cognitive biometrics provide insight into one or more brain processes of the user by means of neural coding and decoding information associated with the cognitive logon credential(s).

13. The computer program product of claim 1, wherein further, through evaluation of the cognitive logon credentials generated during a single logon session, an unknown shared secret, unique to the logon session, is created between the user and the computer system for authentication and/or authorization purposes.

14. The computer program product of claim 1, whereby the computer system, in selecting the set of one or more random cognitive logon variables, has indirectly delineated the responses from the user to create the cognitive logon credentials, thereby forming a thought-directed user interface.

15. The computer program product of claim 1, wherein execution of the computer readable program creates an additional layer of security for the user and for the computer system.

16. A computer program product comprising at least one non-transitory computer readable medium tangibly embodying a computer readable program within a computer system having internet and/or intranet connectivity, wherein the computer readable-program when executed: (i) initiates an authorization session by prompting a user with a set of one or more random cognitive logon variables; (ii) receives input from the user comprising a response to each random cognitive logon variable; (iii) determines a level of accuracy of each response received from the user independently of any response received from the user during a prior authorization session; (iv) transforms each response that meets or exceeds a specified level of accuracy when compared to an accurate response criterion established for each random cognitive logon variable into a cognitive logon credential; (v) generates data output regarding the cognitive logon credential(s); (vi) initiates a prescribed action based on the cognitive logon credential(s), said action including instructing the computer system to grant or deny access to the user to all or part of the computer system; (vii) and stores data in, and retrieves data from, a target storage area.

17. A computer program product comprising at least one non-transitory computer readable medium tangibly embodying a computer readable program within a computer system having internet and/or intranet connectivity, wherein the computer readable-program when executed: (i) initiates an authorization session by prompting a user with a set of one or more random cognitive logon variables, each random cognitive logon variable having at least one accurate answer; (ii) receives input from the user comprising a response to each random cognitive logon variable; (iii) determines a level of accuracy of each response received from the user by comparing the response to each random cognitive logon variable to the at least one accurate answer associated with the random cognitive logon variable; (iv) transforms each response that meets or exceeds a set level of accuracy which is independent of a user's previous performance into a cognitive logon credential; (v) generates data output regarding the cognitive logon credential(s); (vi) initiates a prescribed action based on the cognitive logon credential(s), said action including instructing the computer system to grant or deny access to the user to all or part of the computer system; (vii) and stores data in, and retrieves data from, a target storage area.

* * * * *